United States Patent [19]
Hazlitt et al.

[11] Patent Number: 5,932,360
[45] Date of Patent: Aug. 3, 1999

[54] HOLLOW SHELL WITH INTERNAL BAFFLE

[75] Inventors: Paul Hazlitt, New Providence; Edward Howanice, Little Falls, both of N.J.

[73] Assignee: Servometer Corporation, Cedar Grove, N.J.

[21] Appl. No.: 08/870,806

[22] Filed: Jun. 6, 1997

[51] Int. Cl.$^6$ ........................................................ B32B 3/00
[52] U.S. Cl. ........................... 428/621; 205/67; 250/352
[58] Field of Search ............................. 250/352; 205/67; 428/76, 621, 680; 148/127

[56] References Cited

U.S. PATENT DOCUMENTS

| | | | |
|---|---|---|---|
| 3,187,639 | 6/1965 | Kelly et al. ................................. | 92/47 |
| 3,457,157 | 7/1969 | Mattia ....................................... | 204/208 |
| 3,937,266 | 2/1976 | Cordone et al. ........................... | 164/9 |
| 3,939,046 | 2/1976 | Conn et al. ................................. | 204/4 |
| 3,948,309 | 4/1976 | Cordone et al. ........................... | 164/98 |
| 4,300,959 | 11/1981 | Hurwitz et al. .......................... | 148/127 |
| 5,188,876 | 2/1993 | Hensel et al. .............................. | 428/76 |
| 5,196,106 | 3/1993 | DuPree et al. ............................. | 205/67 |
| 5,315,116 | 5/1994 | DuPree et al. ............................. | 250/352 |

OTHER PUBLICATIONS

W.H. Safranek, A Survey of Electroforming for Fabricating Structures, Oct. 1996 — Plating, vol. 53, pp. 1211–1216.

*Primary Examiner*—Deborah Jones
*Assistant Examiner*—Darlene David
*Attorney, Agent, or Firm*—Allen N. Friedman; McCarter & English, LLP

[57] ABSTRACT

A hollow thin walled shell with integral internal baffles is formed by a multilayer coating process. A series of mandrels is designed to be assembled to form the outer surface of the desired shell. The mandrel surfaces hidden during assembly include the areas intended to form the internal baffles. The mandrels are coated separately, assembled, and the assembly is given a continuous overcoating that holds the assembly together and provides the shell with mechanical integrity. The assembly is machined to remove all internal and external coated surfaces not intended to be included in the shell and the mandrel is dissolved or otherwise removed, leaving the thin coatings as the desired shell with baffles at the areas where the coated mandrel surfaces were hidden during assembly.

19 Claims, 4 Drawing Sheets

HOLLOW SHELL WITH INTERNAL BAFFLE

BACKGROUND OF THE INVENTION

1. Field of the Invention

The invention is in the field of fabrication of thin walled objects, such as infrared absorbent cold shields for infrared cameras and sensors.

2. Background Art

Deposition processes have been used in the past to produce self supporting objects. Mattia (U.S. Pat. No. 3,457,157, issued Jul. 22, 1969) discloses an apparatus for producing tubing of various cross section shapes by an electroforming process. Conn, et al. (U.S. Pat. No. 3,939,046, issued Feb. 17, 1976) disclose a method of electroforming a thin metal foil with a desired raised pattern by coating a thin metal layer on a master substrate embossed with the desired pattern. The master is made of one material, such as aluminum, and the deposited layer is of another material, such as nickel, that is not soluble in a liquid that will dissolve the master material. The master is dissolved, leaving a patterned foil. The use of multilayer platings to achieve particular mechanical properties is disclosed. Kelly, et. al. (U.S. Pat. No. 3,187,639, issued Jun. 8, 1965 and by Hurwitz, et.al. (U.S. Pat. No. 4,300,959, issued Nov. 17, 1981).

Deposition methods, materials, and solutions for electroplating and other forms of film deposition, such as electroless plating, evaporation coating, sputtering, and reactive sputtering are widely known, since surface layer deposition for many applications is a important industrial process. A review article of particular interest in connection with the herein disclosed invention is "A Survey of Electroforming for Fabricating Structures", W. H. Safranek, Plating, Vol. 53, No. 10, Pp. 1211–1216 (October 1966). This article details many uses for thin wall electroformed structures and the materials, solutions, and plating conditions used and the range of variation of these quantities to produce layers with different properties. The disclosure of this article is incorporated herein. There are similar extensive literatures in other coating fields.

The use of electroforming to produce an infrared absorbing cold shield is disclosed by DuPree, et. al. in U.S. Pat. No. 5,196,106. DuPree's invention lies in the provision of a layer of infrared absorbing material on the interior surface of the electroformed shell. Such cold shields are used to surround the detection element of an infrared camera and shield the element from any infrared radiation outside of a prescribed cone of radiation entering through an aperture at the top of the shield. Radiation entering the aperture at larger angles strikes the inside shield wall. DuPree's interior coating is intended to absorb such unwanted radiation and prevent its reflection onto the detection element. Another approach to capturing infrared radiation entering the aperture outside of the prescribed cone of angles and to more precisely define the acceptance cone is to provide the shield with a series of internal baffles. However, the fabrication of shield with internal baffles has, heretofore, required costly assembly steps and use of adhesives that can produce outgassing and contamination in the low temperature and high vacuum environments in which these devices are often used. Such assembled structures are also susceptible to mechanical failure at the joints between the shell and baffles and to assembly errors.

SUMMARY OF THE INVENTION

The herein disclosed invention is a thin walled shell with integral internal baffles of the type that can be designed for use as an infrared cold shield. It is produced as one piece, requiring no costly assembly steps or extraneous adhesive materials that can cause contamination problems. The one piece construction greatly reduces the number of possible mechanical failure modes and the possibility of assembly errors. This unique article, a hollow thin walled shell with integral internal baffles, is formed by a multilayer coating process. A series of mandrels is designed to be assembled to form the outer surface of the desired shell. The mandrel surfaces hidden during assembly include the areas intended to form the internal baffles. The mandrels are coated separately, assembled, and the assembly is given a continuous overcoating that holds the assembly together and provides the shell with mechanical integrity. The assembly is machined to remove all internal and external coated surfaces not intended to be included in the shell (internal surfaces may be machined prior to assembly) and the mandrel is dissolved or otherwise removed leaving the thin coatings as the desired shell with baffles at the areas where the coated mandrel surfaces were hidden during assembly.

For the infrared cold shield application, nickel layers electrolytically deposited on aluminum mandrels produce high quality self supporting, sturdy cold shields with wall thicknesses in the range of one to ten one-thousandths of an inch for shells in the one inch size range. This technique is equally capable of employing the many other known deposition techniques to produce similar shells of a wide variety of metallic and insulating materials.

DETAILED DESCRIPTION OF THE INVENTION

Figure 1:
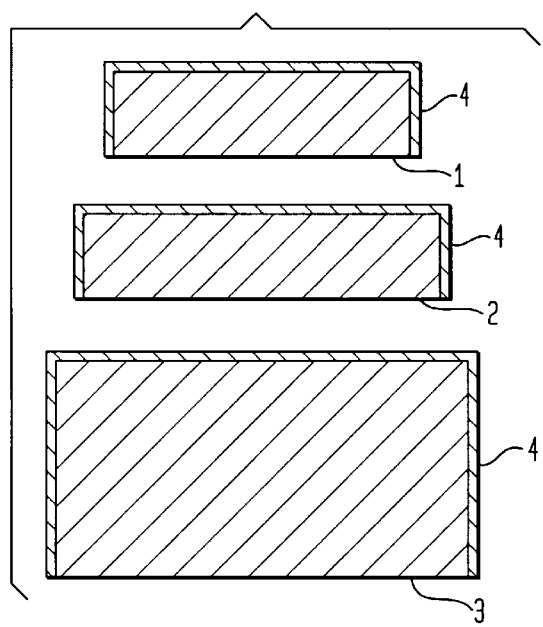
FIG. 1 is an elevational view, partially in section, of an exemplary set of mandrels with a first deposited layer.
Figure 2:
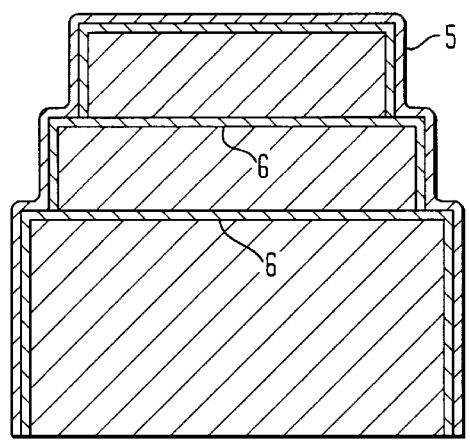
FIG. 2 is an elevational view in section of an exemplary set of assembled mandrels with a continuous overplating.

FIGS. 1–4 show, in a fundamental way, an exemplary procedure for fabricating a shell with integral internal baffles. In FIG. 1 a set of mandrels 1, 2, 3 is coated with a layer 4. In a preferred embodiment, the mandrels are aluminum and the layer is electrolytically deposited nickel. The mandrels are assembled, as shown in FIG. 2, hiding portions 6 of the deposited layer on mandrels 2 and 3. The assembly is then coated with a seamless layer 5, that holds the assembly together. In a preferred embodiment, the layer is also nickel and the layers 4, 5 are approximately 0.003 inches thick for a shell two centimeters in diameter and two centimeters high. Larger shells, typically, require thicker walls to provide sufficient mechanical strength.

Figure 3:
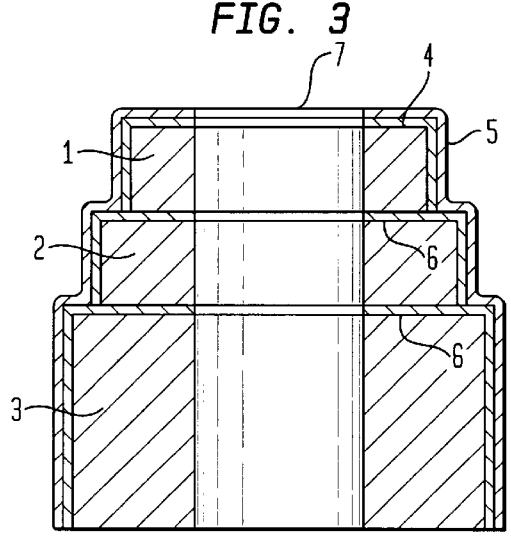
FIG. 3 is an elevational view in section of a set of overplated mandrels that have been machined to remove unwanted portions of deposited layer.
Figure 4:
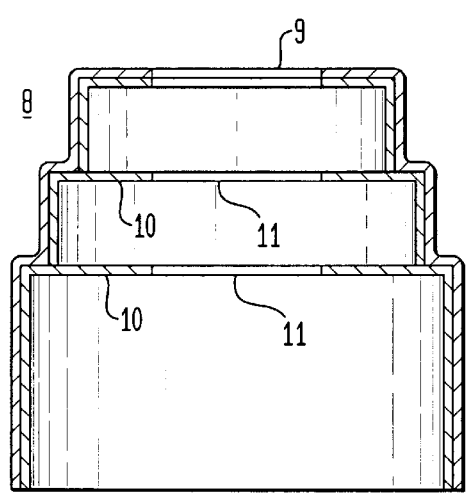
FIG. 4 is an elevational view in section of a hollow thin wall shell of the invention.

In FIG. 3 a hole has been machined down through the assembly, removing the portion of the platings 4, 5 that are not intended to form part of the shell. The remaining hidden portions 6 of the first deposited layer 4 will form the integral internal baffles. When the remainder of the mandrels 1, 2, 3 is dissolved, the shell 8 illustrated in FIG. 4 remains as a free standing, self-supporting structure. When used as a cold shield for an infrared camera, infrared rays within a desired cone of angles will enter the aperture 9 and impinge on a detector element located below the shell 8. Unwanted rays entering the aperture 9 will strike the baffles 10 and be reflected or absorbed.

Figure 5:
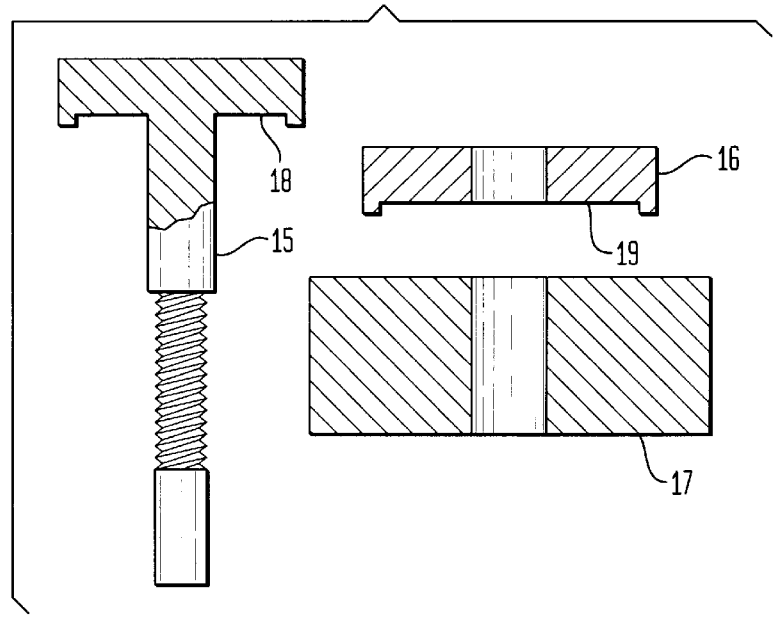
FIG. 5 is an elevational view, partially in section, of an exemplary set of mandrels.
Figure 6:
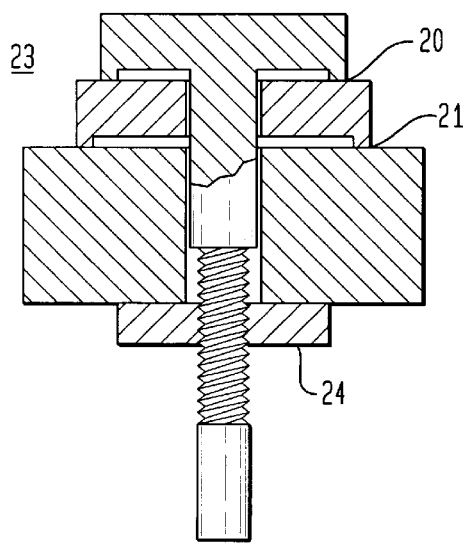
FIG. 6 is an elevational view, partially in section, of an exemplary set of assembled mandrels.

FIG. 5 illustrates a practical example of how a set of mandrels 15, 16, 17 can be shaped for ease of assembly. The lower surfaces 18, 19 of the upper mandrels 15, 16 are slightly undercut so that, when assembled as in FIG. 6, there is a close fit at the joints 20, 21 between the mandrels. The fit at the joints should be tight, with no significant gaps, to optimize the mechanical integrity of the shell 22. The shaft of the upper mandrel 15 is threaded so that the assembly 23 can be held together by a nut 24. Note that FIG. 6 is only intended to illustrate the method of assembly and, in this figure, the mandrels have not yet received the first coating.

Figure 7:
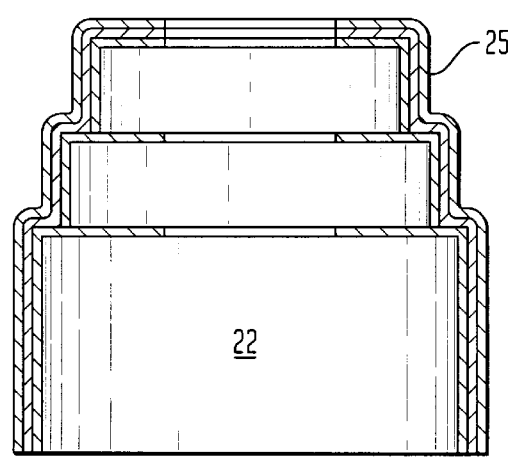
FIG. 7 is an elevational view in section of a hollow thin wall shell of the invention showing an additional continuous overplating.

FIG. 7 illustrates the possible utilization of one or more additional layers. Such layers may be desired to modify the shell surface (e.g., a gold layer to improve the reflectivity of the shell), to provide a surface that might be more easily bonded to the remainder of the camera, or to improve the structural strength of the shell 22.

Figure 8:
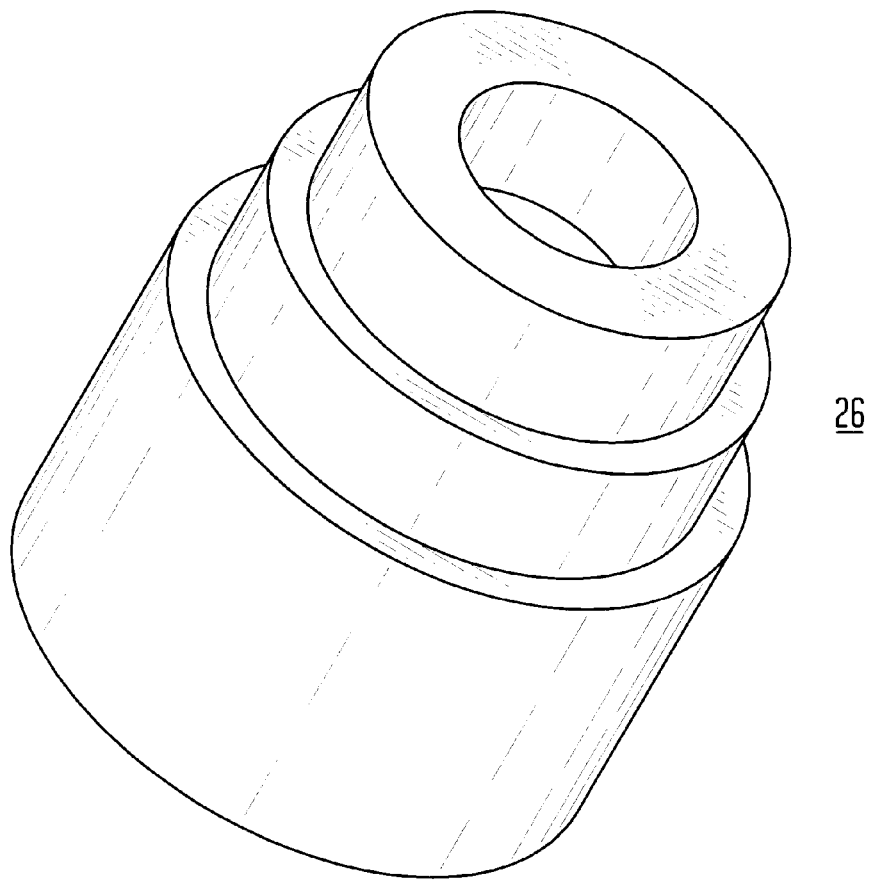
FIG. 8 is a perspective view of a hollow thin wall shell of the invention.

FIG. 8 shows a perspective view of a shell 26 fabricated as illustrated above. This structure is only an example of the many kinds of shells, with integral internal elements, that a worker in the art can fabricate for many purposes, using the "assembled mandrel—multilayer coating" process that is the basis of the herein disclosed invention.

Figure 9:
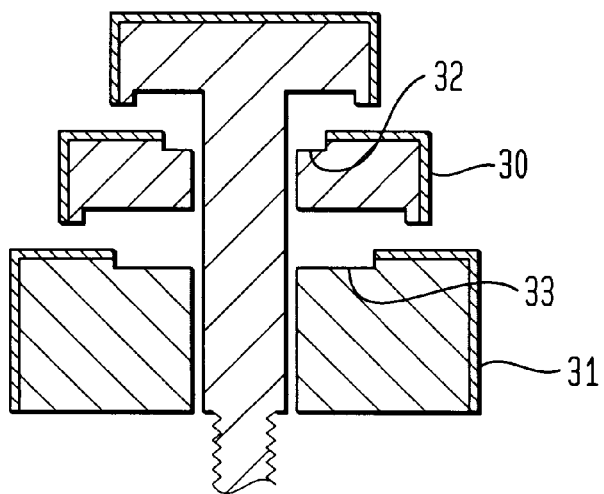
FIG. 9 is an elevational view in section of an exemplary set of mandrels that have been machined after first plating.
Figure 10:
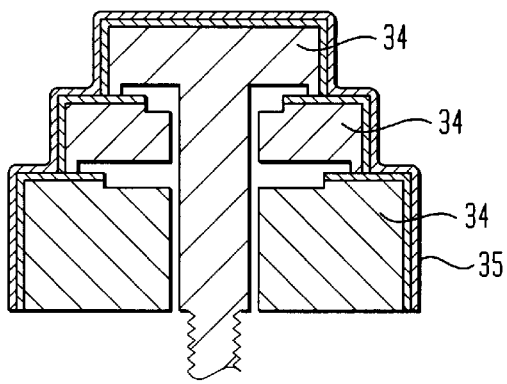
FIG. 10 is an elevational view in section of the FIG. 9 mandrels with a continuous overplating.
Figure 11:
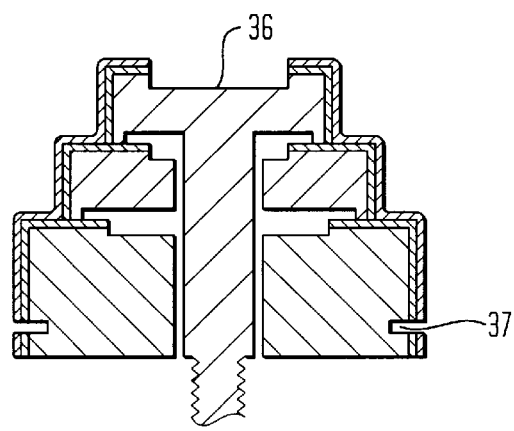
FIG. 11 is an elevational view in section of the FIG. 10 mandrels machined to remove all unwanted plating.

FIG. 3 shows a single machined hole 7 that results in a shell 8 in which the internal baffles 10 define apertures 11 of the same diameter as the external aperture 9. If a shell is required to have internal apertures of different sizes than the external aperture, the internal coated surfaces can be machined after the first coating but before the mandrels are assembled for application of the seamless outer coating. FIG. 9 shows a set of mandrels in which the two mandrels 30, 31, having plated surfaces that will be baffles after assembly, have been machined prior to assembly. The assembled mandrels 34 with their seamless outer coating 35 are shown in FIG. 10. FIG. 11 shows the result of machining 36 to define the outer aperture and machining 37 to define the height of the shell.

Figure 12:
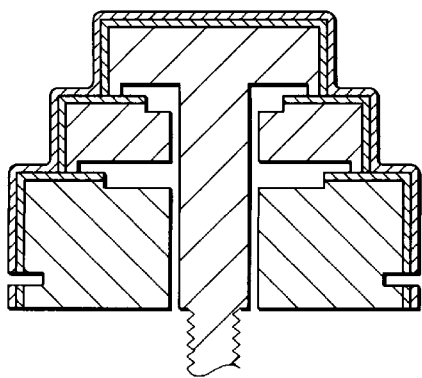
FIG. 12 is an elevational view in section of the FIG. 10 mandrels machined to remove all unwanted plating.

Machining prior to assembly is also useful when the application for which the shell is designed, requires a baffled cup, as illustrated in FIG. 12, with no aperture in the outer shell wall.

It is apparent that a worker in the art, in view of the particular requirements of the application for which the shell is intended can vary the particular design in many ways, within the teaching of the invention. For example, if the outermost coating is thick enough to provide the required mechanical properties, the uppermost mandrel need not receive a first plating.

Deposition Processes

The processing illustrated in FIGS. 1–12 can be applied to many coating methods and material systems to produce thin walled shells with integral internal structures, which can be referred to as baffles. The use of electrolytic deposition (i.e., electroplating) to form various kinds of thin structures is amply illustrated in the prior art referred to above. However, many other thin film deposition processes are known, each having a range of applicability to different kinds of materials and material systems. Electroless plating can plate metal films on nonconducting mandrels. For example, the Safranek article discloses the use of an initial electroless deposition of copper or nickel to metalize an insulating form for subsequent electrolytic deposition.

Several vacuum deposition techniques are known. In the vapor deposition (or evaporation coating) technique, the article to be coated is placed in a vacuum chamber adjacent to a source of the metal to be deposited. The source is heated until its surface emits atoms or molecules of source material. When these particles strike the target article, a coating of the source material is formed. This technique most widely used for deposition of metals.

In the sputtering technique a plasma discharge is formed adjacent to the source and ions from the plasma discharge strike the source, dislodging particles of source material, which deposit as a layer on the target article. Both metallic and insulating materials can be deposited in this way.

In reactive sputtering, a quantity of gas that will chemically react with the source material is introduced into the vacuum chamber. This gas reacts with the source material at the surface of the target forming a layer of the resulting compound. Oxide glasses of materials like silicon dioxide can be deposited by this process, using, for example, a silicon source and introducing oxygen into the deposition chamber.

In chemical vapor deposition, two or more gases that react chemically with one another are brought into contact with a heated target and react at the target surface, forming a deposited film. Many such gas systems are known, since this process is used, for example, to produce the glass preforms used to draw optical fibers.

Material Systems

The above layer deposition processes are applied to the shell fabrication technique of the herein disclosed invention by selection of a material system that satisfies the following requirements. The layer material and the mandrel must be stable in the deposition environment e.g., vacuum, gas, or deposition liquid. Further, the mandrel material must be removable from the layer material, for example, by melting or dissolving the mandrel under conditions that leave the layer sufficiently intact to produce the desired article.

The Safranek article discloses the use of wax and wax coated mandrels that can be melted from the resulting thin walled shell. The practitioner, consulting the extensive deposition literature, and knowing the desired properties of the article to be fabricated can derive mandrel-shell material systems to satisfy many operational requirements.

Electroforming of Nickel on Aluminum

The exemplary material system that forms the basis of the illustrated technique for fabricating thin walled shells with integral internal baffles, is the nickel-aluminum system. Exemplary shells have been fabricated by electrolytic deposition of nickel layers on aluminum mandrels in a nickel sulfamate bath and dissolving the mandrels in a hot caustic soda solution. Exemplary platings have been performed in a commercially available 20% nickel sulfamate plating bath, widely available as an SN-20 nickel sulfamate bath. The aluminum mandrels were dissolved in an aqueous solution of two thirds of a pound of caustic soda (sodium hydroxide) per gallon of water at approximately 200° F. The nickel layer was sufficiently resistant to the caustic soda to remain visually intact and result in a mechanically strong thin walled shell with integral internal baffles. The above processing is only exemplary. Other processing conditions and aluminum solvents are disclosed in the Safranek article and other references in the extensive electroforming literature.

We claim:

1. A hollow thin walled shell including an outer wall and at least one integral internal baffle, which shell consists essentially of a plurality of layers of deposited material, including a seamless outermost layer, and which baffle consist essentially of at least one fewer layer than the plurality of layers constituting the outer wall.

2. The thin walled shell of claim 1 including a plurality of internal baffles.

3. The thin walled shell of claim 1 in which all of the plurality of layers are of the same composition.

4. The thin walled shell of claim 1 in which the deposited material is a metal.

5. The thin walled shell of claim 4 in which the metal is nickel.

6. The thin walled shell of claim 1 in which the deposited material is an insulating compound.

7. The thin walled shell of claim 1 in which at least one internal baffle defines a first aperture of the same diameter as a second aperture defined by the outer wall.

8. The thin walled shell of claim 1 in which the at least one internal baffle defines a first aperture of different diameters than a second aperture defined by the outer wall.

9. A process for the fabrication of a hollow thin walled shell including an outer wall and at least one integral internal baffle, comprising:
   a) applying a first coating of a first material and a first thickness to a plurality of mandrels consisting essentially of a second material, which second material is soluble in a solvent and which first material resists solution in the solvent;
   b) assembling the mandrels to form an assembly with an outer surface and at least one hidden surface so that the outer surface of the assembly is shaped to define the outer wall and the at least one hidden surface includes the at least one internal baffle;
   c) applying a second coating of a second thickness of a third material seamlessly over the outer surface such that the first coating and the second coating are, together, self supporting without the mandrel;
   d) machining the assembly to remove substantially all of that portion of the first layer and that portion of the second layer not part of the shell; and
   e) dissolving the second material in the solvent.

10. A method of claim 9 in which applying the first coating and applying the second coating is accomplished by at least one coating technique selected from electroplating, electroless plating, vapor deposition, sputtering, reactive sputtering, and chemical vapor deposition.

11. A method of claim 10 in which the coating technique is electroplating and the material of at least the first coating is nickel.

12. A method of claim 11 in which the electroplating is performed in a nickel sulfamate bath.

13. A method of claim 10 in which the coating technique is reactive sputtering and the first material and the second material are silicon dioxide or aluminum oxide.

14. A method of claim 9 comprising applying a third coating, coextensive with the second coating.

15. A method of claim 14 in which the third coating consists essentially of a highly reflective material.

16. A method of claim 9 further comprising the step of machining the plurality of mandrels after applying the first coating in order to prepare the plurality of mandrels for assembly.

17. A process for the fabrication of a hollow thin walled shell with an outer wall and a plurality of integral internal baffles, comprising:
   a) applying a first coating of a first material and a first thickness to a plurality of mandrels consisting of a second material, which second material is selectively removable from the first material;
   b) assembling the mandrels to form an assembly with an outer surface and hidden surfaces such that the outer surface of the assembly is shaped to include the outer wall of the shell and the hidden surfaces include the internal baffles;
   c) applying a second coating of a second thickness of a third material seamlessly over the over the outer surface such that the first coating and the second coating are, together, self supporting without the mandrel;
   d) machining the assembly to remove substantially all of that portion of the first layer and that portion of the second layer not part of the shell; and
   e) selectively removing the second material.

18. A process of claim 17 in which the second material is selectively removed by melting or evaporation.

19. A hollow thin walled shell made by the process of claim 10.

* * * * *